US009698695B1

(12) United States Patent
Fahlenkamp et al.

(10) Patent No.: US 9,698,695 B1
(45) Date of Patent: Jul. 4, 2017

(54) PEAK POWER LIMITATION AND OVERPOWER PROTECTION FOR SWITCHED-MODE POWER SUPPLIES

(71) Applicant: Infineon Technologies Austria AG, Villach (AT)

(72) Inventors: Marc Fahlenkamp, Geretsried (DE); Torsten Hinz, Augsburg (DE); Martin Krueger, Oberschleissheim (DE); Josef Neulinger, Petershausen (DE)

(73) Assignee: Infineon Technologies Austria AG, Villach (AT)

( * ) Notice: Subject to any disclaimer, the term of this patent is extended or adjusted under 35 U.S.C. 154(b) by 114 days.

(21) Appl. No.: 14/629,535

(22) Filed: Feb. 24, 2015

Related U.S. Application Data

(60) Provisional application No. 61/971,094, filed on Mar. 27, 2014.

(51) Int. Cl.
*H02M 3/335* (2006.01)
*H02M 1/00* (2006.01)

(52) U.S. Cl.
CPC ........... *H02M 3/33507* (2013.01); *H02M 2001/0038* (2013.01)

(58) Field of Classification Search
CPC ............ H02M 3/335; H02M 3/33507; H02M 3/33523; H02M 3/33515; H02M 3/33538;
(Continued)

(56) References Cited

U.S. PATENT DOCUMENTS

2005/0218877 A1   10/2005   Oswald et al.
2010/0165672 A1*  7/2010   Li ..................... H02M 3/33507
                                                          363/21.16
(Continued)

FOREIGN PATENT DOCUMENTS

CN   102946197 A   2/2013
CN   103414350 A   11/2013

OTHER PUBLICATIONS

Kang, Sang Hee et al., "Efficiency Optimization in Digitally Controlled Flyback DC-DC Converters Over Wide Ranges of Operating Conditions", IEEE Transactions on Power Electronics, vol. 27, No. 8, Aug. 2012, pp. 3734-3748.

*Primary Examiner* — Gustavo Rosario Benitez
*Assistant Examiner* — Carlos Rivera-Perez
(74) *Attorney, Agent, or Firm* — Murphy, Bilak & Homiller, PLLC

(57) ABSTRACT

A method of cycle-by-cycle operation of a switched-mode power converter includes converting an input voltage at the primary side to an output voltage at the secondary side by switching a transistor connected to the primary side from an on-state to an off-state during the present cycle, detecting valleys in a voltage across the transistor in the off-state, determining which valley at which the transistor is to be switched from the off-state to the on-state in the next switching cycle, and determining a maximum peak current limit for the primary side above which the transistor is switched from the on-state to the off-state in the next switching cycle. The maximum peak current limit is determined as a function of the input voltage and the valley at which the transistor is to be switched from the off-state to the on-state in the next switching cycle. Forced valley switching techniques are also disclosed.

4 Claims, 6 Drawing Sheets

(58) Field of Classification Search
CPC ......... H02M 3/33546; H02M 3/33553; H02M 7/537; H02M 7/5387; H02M 7/53871; H02M 7/53873; H02M 2001/325; H02M 2001/327; H02M 2001/009; H02M 1/32; H02M 1/26; H02M 2001/0038; Y02B 70/1416; Y02B 70/1433; Y02B 70/1475; Y02B 70/1441; H02H 3/08; H02H 3/085; H02H 3/087; H02H 9/02
USPC .......... 363/15–26, 40–43, 50, 55–58, 95–99, 363/131–134; 323/205–211, 222–226, 323/271–278, 281–288, 299–303, 351; 361/18, 93.1–101, 103–106
See application file for complete search history.

(56) References Cited

U.S. PATENT DOCUMENTS

2012/0147630 A1\* 6/2012 Cao .................. H02M 1/32
                                                  363/21.15
2014/0036558 A1 2/2014 Tsou et al.

\* cited by examiner

PEAK POWER LIMITATION AND OVERPOWER PROTECTION FOR SWITCHED-MODE POWER SUPPLIES

TECHNICAL FIELD

The present application relates to switched-mode power supplies, in particular peak power limitation and overpower protection for switched-mode power supplies.

BACKGROUND

A switched-mode power supply is an electronic power supply that incorporates a switching regulator to convert electrical power efficiently. A switched-mode power supply transfers power from a source, like mains power, to a load, such as a personal computer, while converting voltage and current characteristics. The pass transistor of a switched-mode supply continually switches between low-dissipation, full-on and full-off states, and spends very little time in the high dissipation transitions, which minimizes wasted energy. Voltage regulation is achieved by varying the on time and the off time (i.e. duty cycle and period may be changed). A switched-mode power supply having an isolated topology includes a transformer, and thus can produce an output of higher or lower voltage than the input. Some converters use a transformer for energy storage, while others use a separate inductor.

In each case, an unexpected increase in load demand e.g. due to a short or error at the load can result in very high power draw. Protection from such over-power and short-circuit conditions is desirable.

SUMMARY

According to an embodiment of a method of cycle-by-cycle operation of a switched-mode power converter having a transformer with a primary side and a secondary side, the method comprises: converting an input voltage at the primary side to an output voltage at the secondary side by switching a transistor connected to the primary side from an on-state to an off-state during the present cycle; detecting valleys in a voltage across the transistor in the off-state; determining which valley at which the transistor is to be switched from the off-state to the on-state in the next switching cycle; and determining a maximum peak current limit for the primary side above which the transistor is switched from the on-state to the off-state in the next switching cycle, the maximum peak current limit being determined as a function of the input voltage and the valley at which the transistor is to be switched from the off-state to the on-state in the next switching cycle.

According to another embodiment of a method of cycle-by-cycle operation of a switched-mode power converter having a transformer with a primary side and a secondary side, the method comprises: converting an input voltage at the primary side to an output voltage at the secondary side by switching a transistor connected to the primary side from an on-state to an off-state during the present cycle; detecting valleys in a voltage across the transistor in the off-state; determining which valley at which the transistor is to be switched from the off-state to the on-state in the next switching cycle; and forcing the transistor to switch from the off-state to the on-state in an earlier valley than previously determined if the maximum peak current limit for the primary side is met or exceeded in the present switching cycle and the previously determined valley is a higher valley for which the maximum peak current limit is determined, allowing the transferred power to be increased.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

Figure 1:
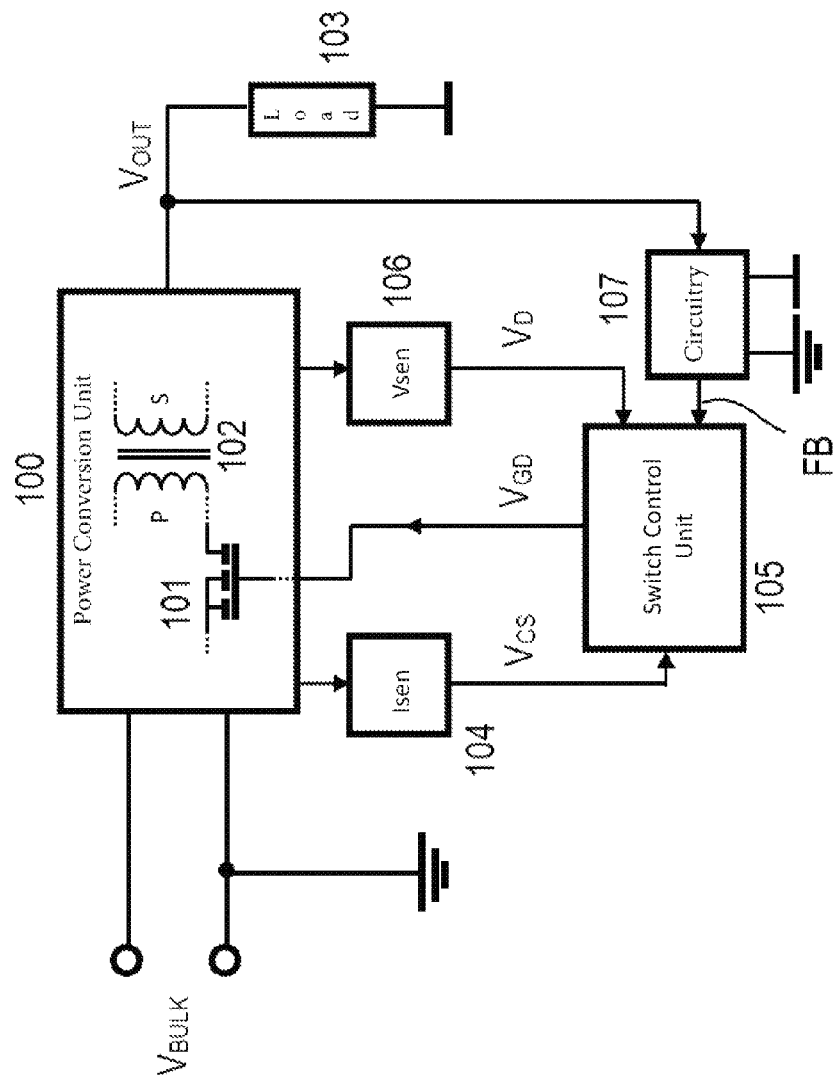
FIG. 1 illustrates a block diagram of a switched-mode power converter.

According to embodiments described herein, peak power limitation and over-power protection are provided for switched-mode power supplies. The peak power limitation technique implements a cycle-by-cycle peak power limitation by control of the maximum peak current and uses a bulk voltage measurement to fold back the maximum peak current. Both fast and slow over-power protection schemes are provided. Fast and slow over-power protection reaction events are programmable (e.g. ignore/auto restart/latch/power-up reset, etc.) and can be handled separately with an asymmetrical and programmable up/down counter to provide efficient filtering before the reaction event. With fast over-power protection, the output and output rectifier are protected from over-current operation. A flag can be detected to determine that peak power limitation is active. With slow over-power protection, the system is protected from continuous over-power operation even though the here peak-power limit is not reached (thermal protection).

In one embodiment, peak power limitation with fold-back and valley number reflection is provided for a power converter which uses peak current limitation for peak power limitation. A measurement of the input (bulk) voltage together with the QRM (quasi-resonant mode) valley number is used to derive the peak current limit for the current voltage and valley to yield accurate peak power limitation. In addition or alternatively, forced valley switching can be used to lower the QRM valley number. If the peak current limit is reached but the valley number is higher than stored in the peak power limit table, then the peak power has not yet been reached due to a higher switching period than pre-calculated and thus the valley number can be decreased. Only if the peak current limit is reached and the valley number is equal to the minimum allowed QRM valley, then the peak power is reached and peak power limitation takes place. Peak power limitation can be used with a counter for fast overpower protection.

Peak power limitation (PPL) and over-power protection (OPP) techniques are provided for switched-mode power supplies. PPL provides cycle-by-cycle peak power limitation by control of the maximum peak current $I_{PKmax}$ and uses a measured bulk (input) voltage $V_{Bulk}$ to fold back the maximum peak current where $V_{Bulk}$ is a bulk, rectified AC voltage input of the system. PPL provides full flexibility as maximum peak current and minimum allowed QRM (quasi-resonant mode) valley (N) stored in a table with an index of the bulk voltage $V_{Bulk}$ (the maximum peak current table fits to frequency law) as given by $i_{Lpkmax}(v_{Bulk}, N=1)$ for any valley N=1,2,3,4, . . . . For example, if there are four QRM valleys then there can be four corresponding tables. In each table, individual peak current limit values are associated with individual input voltage values for the corresponding valley. The individual peak current limit value associated with the input voltage and the valley at which the transistor is to be switched from the off-state to the on-state in the next switching cycle is selected as the maximum peak current limit. In addition the valley number N can be pushed (forced) so that peak power operation has no ambiguities as given by $N \rightarrow N_{OPP}(v_{Bulk})$ and $i_{Lpkmax}(v_{Bulk})=i_{Lpkmax}(v_{Bulk}, N_{OPP}(v_{Bulk}))$. This can reduce the amount of requested tables to have only one table combining valley number N and peak current limit. The peak power limitation and forced valley switching embodiments are described herein in the context of a switched-mode power supply having an isolated topology as shown in FIG. 1.

Referring to FIG. 1, an exemplary switched-mode power converter may include a power conversion unit 100 such as a DC-DC flyback converter, with a pass transistor 101, a magnetic element such as a transformer 102, and other parts (not shown) such as rectifiers, capacitors, etc. The power conversion unit 100 has an input which is supplied with a DC voltage, bulk voltage $V_{BULK}$, and an output which supplies an output voltage $V_{OUT}$ to a load 103. The pass transistor 101 can be a metal oxide semiconductor field-effect transistor (MOSFET), an insulated gate bipolar transistor (IGBT) or the like, and is configured to connect the primary winding (P) of the transformer 102 to voltage $V_{BULK}$ in accordance with a respective control signal $V_{GD}$. The switched-mode power converter can further include a current sense (Isen) module 104 that provides a current sense signal, e.g., a (primary) current sense voltage $V_{CS}$, representing the current flowing through the primary winding of transformer 102. A switch control unit 105 is configured to generate a control signal $V_{GD}$ supplied to the pass transistor 101 for switching the transistor 101 on (conducting) and off (non-conducting) according to the control signal $V_{GD}$. If the pass transistor 101 is a MOSFET or an IGBT, the control signal $V_{GD}$ may be applied to the gate thereof.

The switch control unit 105 is configured to control the switching operation of the power conversion unit 100. In the following examples, the switch control unit 105 is configured to control the power conversion unit 100 to operate at least under certain circumstances in a quasi-resonant (QR) mode, i.e., self-oscillating mode. The switch control unit 105 may further be configured to compare the current sense voltage $V_{CS}$ with a reference voltage. The control signal $V_{GD}$ is set to switch off a primary current flowing into transformer 102 when the current sense signal $V_{CS}$ equals or exceeds the reference voltage.

In quasi-resonant mode, the pass transistor 101 can be switched on when the voltage $V_D$ across the transistor 101 is at a (local) minimum, also known as voltage valley or valley. To achieve this, the switched-mode power converter may comprise a voltage sense (Vsen) module 106 for directly or indirectly monitoring the voltage drop $V_D$ across the pass transistor 101 during the off-time of the transistor 101 in order to allow detecting of the time instant when the voltage is at the minimum (valley). A feedback path from the switched-mode power converter output (i.e., from the output a power conversion unit 100) to the switch control unit 105 can provide an additional input signal, a feedback signal FB, to the switch control unit 105. The feedback path can include basic signal processing (e.g., PI or PID regulation) and galvanic isolation (e.g., by way of opto-electronic couplers etc.) circuitry 107.

Figure 2:
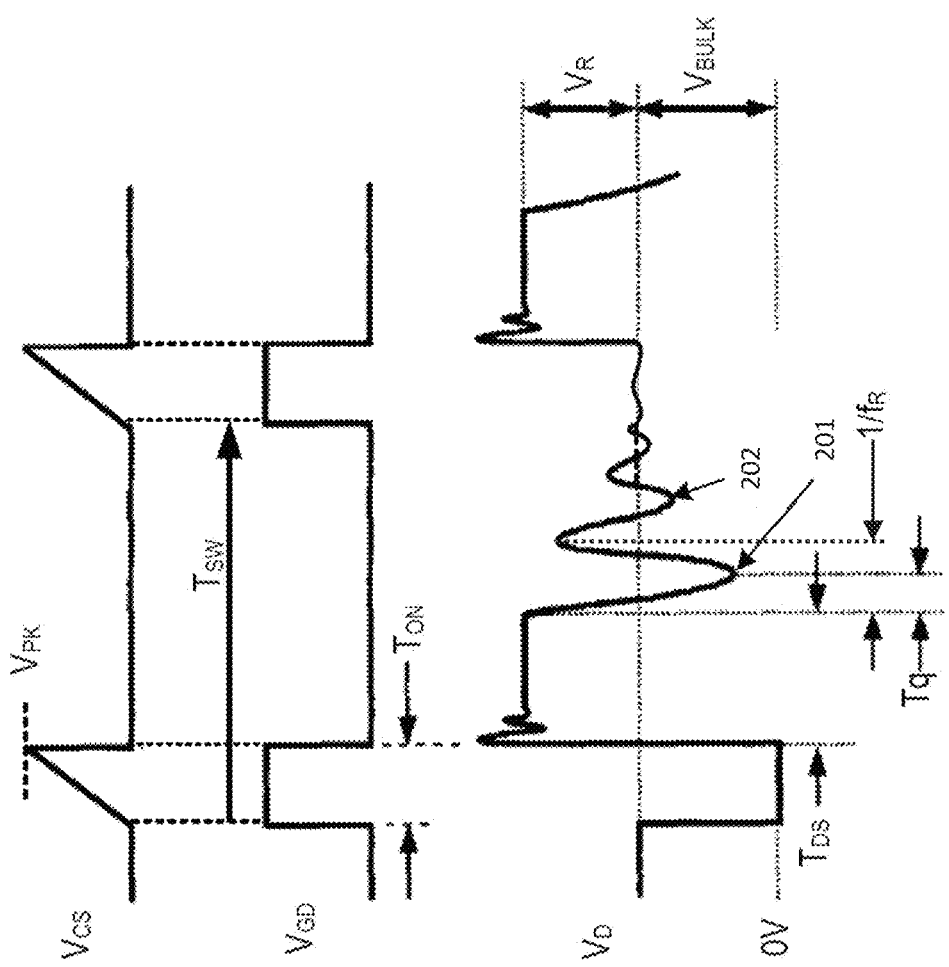
FIG. 2 is a waveform diagram illustrating various switching-related signals for the switched-mode power converter of FIG. 1.

FIG. 2 is a waveform diagram illustrating the voltage drop $V_D$ across the pass transistor 101 in response to the control signal $V_{GD}$ and the current sense signal $V_{CS}$. Switching at the valleys 201, 202, etc. in $V_D$ minimizes switching losses and electromagnetic emissions (EMI). Commonly, a fixed (constant) valley of a number of valleys in a row, e.g., the first, second or any other valley, is used as a trigger for controlling the pass transistor 101 to switch on.

When the pass transistor 101 is switched off, the transformer is conducting its polarity and the energy of the transformer 102 is discharged to the load 103 at the output of the power converter through a capacitor and rectifier (not shown in FIG. 1) so that an output voltage $V_{OUT}$ appears at the load 103. A reflected voltage $V_R$ is generated at this time in the primary winding of the transformer 102 in accordance with the output voltage $V_{OUT}$ and the turn-ratio of the transformer 102. Therefore, the voltage $V_D$ across the pass transistor 101 is equal to the bulk (input) voltage $V_{BULK}$ plus the reflected voltage $V_R$ once the transistor 101 is turned off. The energy corresponding to the voltage $V_D$ is stored in a parasitic capacitor which includes all applicable parasitic capacitance such as the drain-source capacitance of the pass transistor 101 and winding capacitance of the transformer 102. After a discharge period $T_{DS}$, the energy of the transformer 102 is fully discharged and the energy stored in the parasitic capacitor flows back to the bulk (input) voltage $V_{BULK}$ through the primary winding of the transformer 102. The parasitic capacitor and the inductance of the primary winding develop a resonant tank having a resonant frequency $f_R$.

During the resonant period, the energy of the parasitic capacitor is delivered back and forth from and to the inductance provided by primary winding. Discharging of the parasitic capacitor to a (first) valley voltage 201 (followed by subsequent valleys 202, etc.) of voltage $V_D$ takes places during a delay time $T_q$. The delay time $T_q$ is one half of the period of the quasi-resonance and can be expressed as $$T_q = \frac{1}{2 \cdot f_R}.$$

If the pass transistor 101 is turned on during one of the voltage valleys 201, 202, etc. across the transistor 101, switching loss and EMI can be decreased.

As can be seen from FIG. 2, the current sense signal $V_{CS}$, which is representative of the primary winding current $I_P$, increases during the time period $T_{ON}$ in which the pass transistor 101 is switched on until the peak current threshold $I_{PK}$ (which corresponds to $V_{PK}$ in FIG. 2) is reached and the transistor 101 is switched off until the next cycle. The time period between rising edges of successive on-time periods $T_{ON}$ is referred to as switching time period $T_{SW}$. The feedback signal FB is used to generate the peak current threshold $I_{PK}$ which in turn determines the time period $T_{SW}$ in QR mode.

Both fast and slow OPP (overpower protection) can be provided in QR mode. Fast and slow OPP can be handled e.g. every 100 µs time frame. Fast and slow OPP reaction events are programmable (e.g. ignore/auto restart/latch/power-up reset, etc.). Fast and slow OPP events can be handled separately e.g. with an asymmetrical and programmable up/down counter to provide efficient filtering before the reaction event. Fast OPP protects the output and output rectifier during over-current operation using a flag that shows that peak-power limitation is active. Slow OPP protects the system for continuous over-power operation when the peak-power limit is not reached to provide thermal protection. Slow OPP detection uses a bulk voltage measurement $V_{Bulk}$ e.g. via a ZCD (zero-current detection) pin, a peak current setting $I_{PK}$ e.g. via a CS (current sense) pin, gate on time $t_{on}$ and switching cycle period $t_{sw}$ to calculate an average power of one switching cycle where $$p_{Bulk} = \frac{1}{2} L_P i_{Lpk}^2 f_{Sw} \text{ and } \frac{1}{f_{Sw}} = L_P i_{Lpk} \left( \frac{1}{v_{Bulk}} + \frac{1}{v_R} \right) + \left( N - \frac{1}{2} \right) \cdot t_{Osc}.$$

Fast OPP can be implemented as a timer based protection. An asymmetrical up/down timer can be activated to count up when the system enters peak-power limitation. After a configurable time, the system declares OPP and enters auto restart. During startup the fast OPP is disabled, and therefore $V_{out}$ gating checks can be implemented. After a certain configurable time, the output is expected to be above a dedicated voltage level. If this is not the case, an OPP is declared and the system enters auto restart. The fast OPP detection is enabled at a configurable time after start of the operation. For operation above nominal power but not at peak power limitation, slow OPP protects the system. Slow OPP is based on a flyback cycle true calculation of the average input power.

Figure 3:
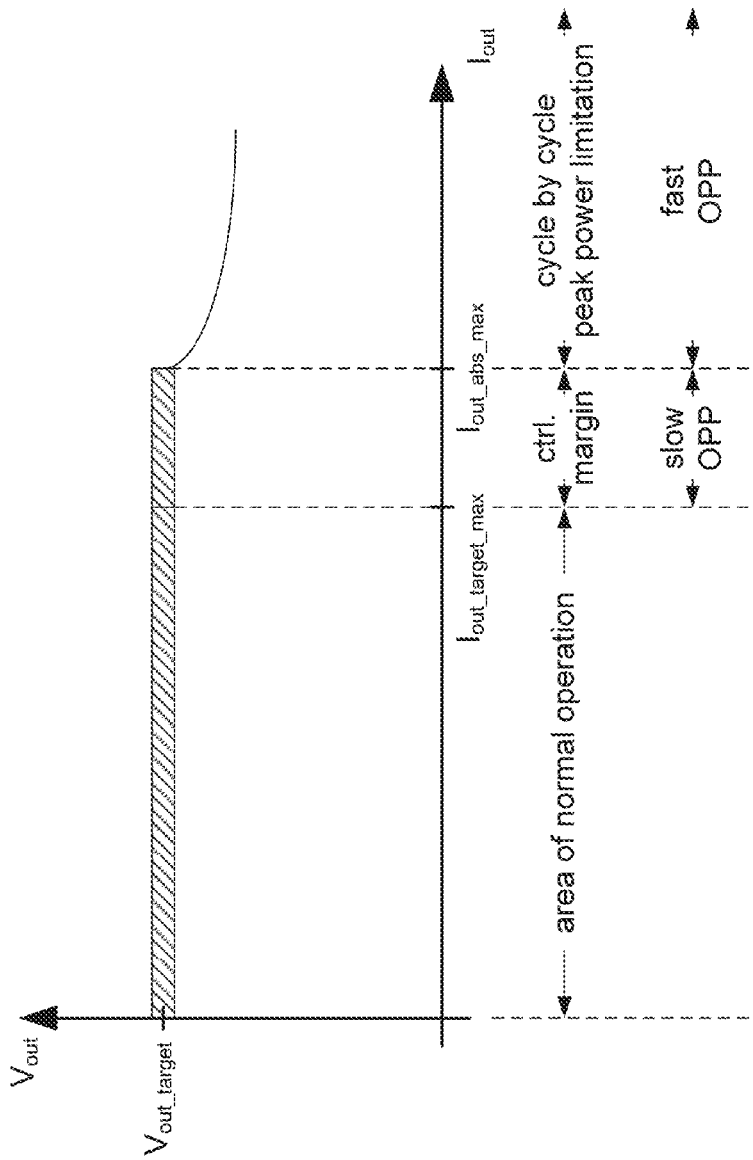
FIG. 3 shows different peak-power limitation and over-power protection OPP operation areas for the switched-mode power converter of FIG. 1, as a function of output voltage and current.

FIG. 3 shows the different operation areas of the peak-power limitation and OPP operation as a function of $V_{out}$ vs. $I_{out}$. In the area of normal operation, the output voltage $V_{out}$ is regulated to the target output voltage $V_{out\_target}$ within the allowed tolerance band independent of the output current $I_{out}$ up to a maximum target output current $I_{out\_target\_max}$. The transformer 102 must be able to provide more current for output voltage regulation meaning that if the output voltage drops, the transformer 102 must provide the output current $I_{out\_target\_max}$ plus an additional current up to total $I_{out\_abs\_max}$ for recharging of the output capacitor back to the target output voltage $V_{out\_target}$. This area is shown as control margin ('ctrl. margin') in FIG. 3. If the current is rising to more than $I_{out\_abs\_max}$, the system provides peak-power limitation by limiting the peak current $I_{PK}$ on the primary side to a value that depends on the bulk voltage $V_{Bulk}$. In this area the system puts out limited power meaning that if the output voltage $V_{out}$ drops and the output current $I_{out}$ rises.

If the system operates in the control margin area for longer times, the system operates at over-power but the peak-power limitation does not occur. To protect the system for example from overheating (so-called thermal design) if it operates longer times in this area, the slow OPP detects this via an input power calculation and filters it accordingly and if necessary reacts with a programmed mode like for example with auto restart. If the system operates in the cycle-by-cycle peak-power limitation area, the output current $I_{out}$ can rise to high values which can destroy for example the output rectifier. To protect the system, the fast OPP detects this via a flag showing that peak-power limitation is active, filters it accordingly and if necessary reacts with a programmed mode like for example with auto restart.

Figure 4:
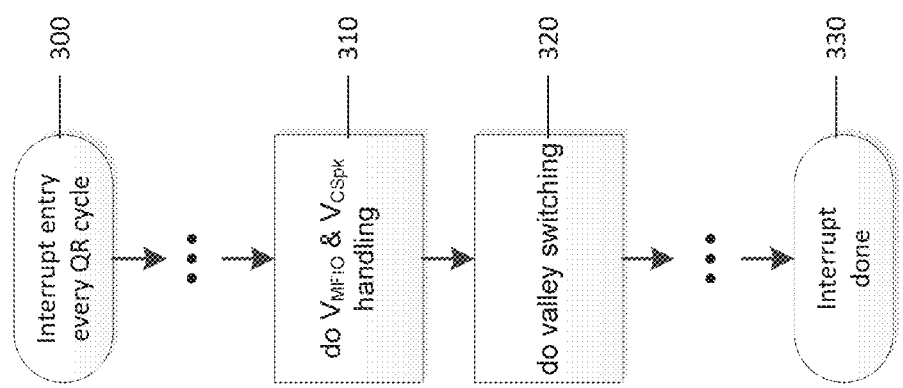
FIG. 4 is a flow diagram showing peak current setting and valley switching procedures performed during switching cycle based interrupts.

FIG. 4 is a flow diagram illustrating peak current setting ($V_{MFIO}=FB/V_{CSpk}$) and valley switching procedures performed during switching cycle based interrupts. An interrupt occurs every QR cycle (Block 300). During the switching cycle interrupt, the $V_{MFIO}/I_{CSpk}$ handling procedure (Block 310) and the valley switching procedure (Block 320) are performed before the interrupt process completes (Block 330). Peak power limitation is integrated into both the $V_{MFIO}/V_{CSpk}$ handling and the valley switching procedures.

Figure 5:
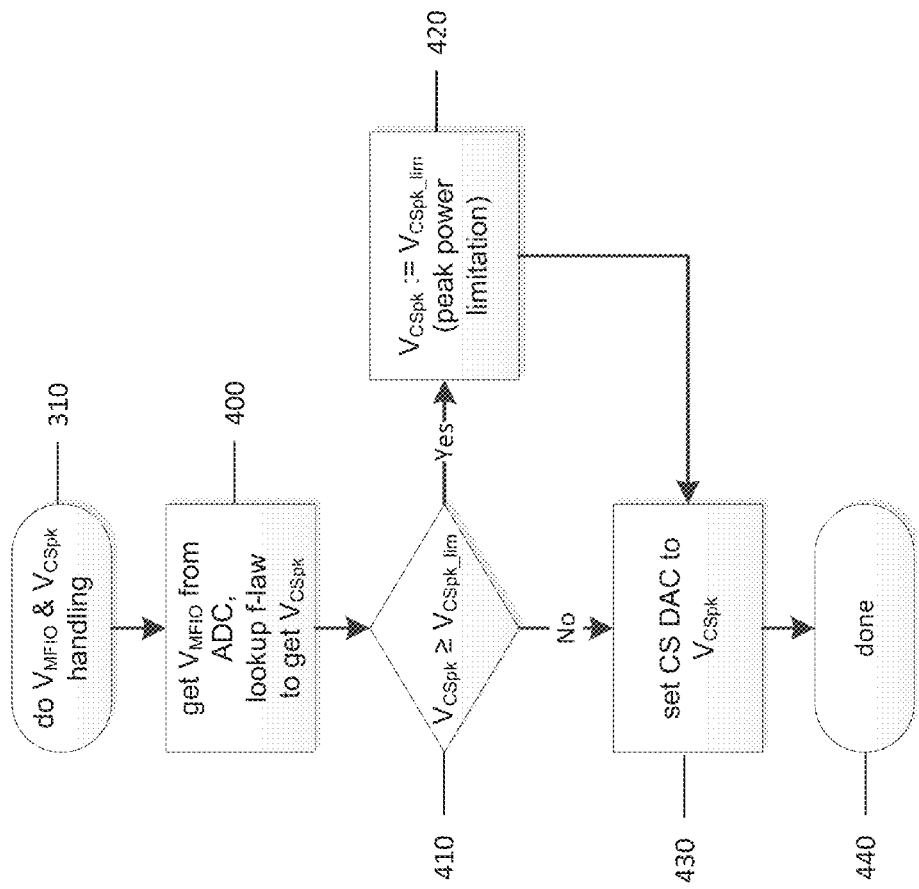
FIG. 5 is a flow diagram illustrating the peak current setting procedure of FIG. 4 in greater detail.

FIG. 5 is a flow diagram illustrating the peak current setting ($V_{MFIO}/V_{CSpk}$) handling procedure of FIG. 4 in greater detail. The $V_{MFIO}/V_{CSpk}$ handling procedure starts by getting the feedback voltage FB=$V_{MFIO}$ out of an ADC (analog-to-digital converter) channel (Block 400). For example, a nominal voltage level of 0V is converted to value '0' and a voltage level of 2.4V is converted to value '255'. As the $V_{MFIO}$ can rise up to e.g. VDD=3.3V, it is ensured that the digital value of the converted $V_{MFIO}$ voltage reaches 255 even taking the tolerances of the ADC into account. The process looks up the value for the $V_{CSpk}$ (=$V_{PK}$ in FIG. 2) out of a frequency law (f-law) table using the digitized $V_{MFIO}$ value as an index (Block 400). This $V_{CSpk}$ value is compared with a $V_{CSpk\_lim}$ value which is provided by the 100 µs interrupt out of a lookup table for the peak power limitation using the digitized value of $V_{Bulk}$ as an index (fold back algorithm) (Block 410). If the $V_{CSpk}$ value out of the frequency law lookup table is bigger then $V_{CSpl\_lim}$, $V_{CSpk}$ is set to the limit $V_{CSpk\_lim}$ (Block 420). This ensures together with the valley switching rules below that the peak power does not exceed a predefined level. The peak current setting $V_{CSpk}$ is transferred e.g. to a DAC connected to a comparator at pin CS (Block 430), and the peak current setting procedure ends (Block 440). The comparator monitors the voltage $V_{CS}$ and generates a signal if $V_{CS}=V_{CSpk}$ to initiate a falling edge on signal $V_{GD}$ to change the transistor from the on-state to the off-state according to FIG. 2.

Figure 6:
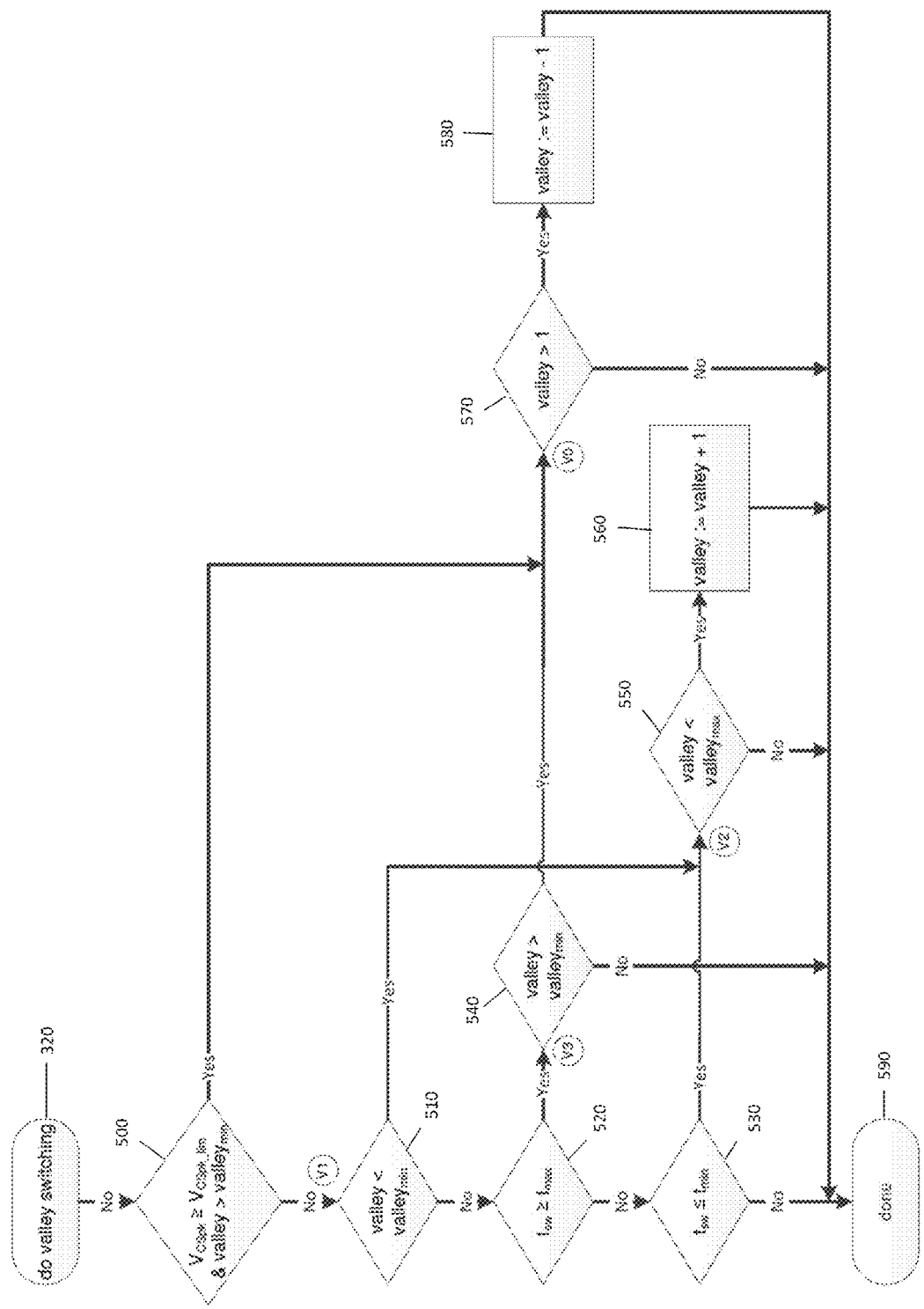
FIG. 6 is a flow diagram illustrating the valley switching procedure of FIG. 4 in greater detail.

FIG. 6 is a flow diagram illustrating the valley switching procedure of FIG. 4 in greater detail. A general rule for valley switching is the $t_{min}$ and $t_{max}$ borders. If the switching cycle $t_{sw}$ exceeds the band given by $t_{min}$ and $t_{max}$, the valley is changed (Blocks 510-580). To handle the peak power limitation, additional valley switching rules are applied. For example, a lookup table for the peak power limitation provides not only $V_{CSpk\_lim}$ value within the 100 µs interrupt but additionally a value for valley$_{min}$ also provided within the 100 µs interrupt. This means the given value of $V_{CSpk\_lim}$ is only valid for the valley number valley$_{min}$. Therefore, the first check in the valley switching process is if the peak current limit $V_{CSpk\_lim}$ out of the peak power limitation table is applied for $V_{CSpk}$ but the current (present) valley number valley is higher than valley$_{min}$ (Block 500). This means the peak power is not reached yet as the switching frequency is lower than for the calculated limit. To prevent the system from a dead lock, the parameter valley is decreased in this case to force the system to achieve the peak power (Blocks 570, 580).

The second check in the valley switching process is if the current (present) valley is smaller than valley$_{min}$ (Block 510). This can happen if V$_{Bulk}$ has decreased during the time and the system is operating in a lower valley number as this might be allowed before due to higher voltage of V$_{Bulk}$. To ensure proper operation of the peak power limitation value V$_{CSpk\_lim}$ out of the peak power limitation table, the system is forced to increase valley (Blocks 550, 560). The other two conditions in the valley switching procedure are the normal frequency law and valley changing rule that ensure the switching frequency is moved back to the allowed frequency band (Blocks 520, 530, 540). The valley switching procedure then ends (Block 590), and is repeated for each succeeding QRM switching cycle.

The fast OPP algorithm uses a flag showing that peak-power limitation is active to detect an over-power condition. The algorithm is performed during the 100 µs interrupt and does the following steps: check if the flag showing that peak power limitation is active; if true, increment an up/down counter (FAST_OPP_COUNTER, 16 bit, always positive) by value of FW parameter FAST_OPP_INC; check if this counter is equal or above FAST_OPP_CNT_LIMIT; if true, do action according to FW parameter FAST_OPP_MODE (ignore/auto restart/latch/power up reset); if the flag shows that peak power limitation is inactive, decrement the up/down counter FAST_OPP_COUNTER by FAST_OPP_DEC down to 0. Using the FW parameters, the fast OPP can adjust how fast the fast OPP detection is performed to protect the system properly.

In the following formula of calculating the peak current for any point in one of the QRM valley tables, L$_p$ is the main transformer inductance, $$n = \frac{n_s}{n_p}$$

is the transformer turns ratio, $\overline{V}_g$ is the steady-state bulk voltage, $\overline{V}_o$ is the steady-state output voltage, $\overline{V}_r$ is the steady-state reflected voltage, P$_o$ is the output power, and T$_w$ is the QRM waiting time. The reflected voltage is given by $$v_R = \frac{N_{primary}}{N_{secondary}}(v_{Out} + v_{Diode}).$$

During the on-time $$v_{Bulk} = \frac{L_p di_L}{dt}$$

and during the discharge time $$v_R = -\frac{L_p di_L}{dt}$$

and $$v_{Out} = v_{Diode} = -\frac{L_s di_{Lsec}}{dt}.$$

Based on these conditions, the peak current limit is given by:

$$\overline{I}_{pk} = n \cdot \frac{P_o}{V_o} \cdot \frac{\overline{V}_g + \overline{V}_r}{\overline{V}_g} \cdot \left[1 + \sqrt{1 + \frac{2 \cdot \overline{V}_r \cdot \overline{V}_g^2 \cdot T_w}{n \cdot L_p \frac{P_o}{V_o} \cdot (\overline{V}_g + \overline{V}_r)^2}}\right] \quad (1)$$

and the output power is given by:

$$P_o = \frac{V_o \cdot L_p}{2 \cdot n} \cdot \frac{\overline{I}_{pk}^2}{(\overline{V}_g + \overline{V}_r) \cdot \frac{\overline{I}_{pk}}{\overline{V}_g} \cdot L_p + \overline{V}_r \cdot T_w}. \quad (2)$$

Example embodiments have been described herein, with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions can be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions can also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts can be embodied in hardware and/or in software (including firmware, resident software, microcode, etc.) running on a processor such as a digital signal processor, which can collectively be referred to as "circuitry," "a module" "a controller" or variants thereof.

Terms such as "first", "second", and the like, are used to describe various elements, regions, sections, etc. and are not intended to be limiting. Like terms refer to like elements throughout the description.

As used herein, the terms "having", "containing", "including", "comprising" and the like are open-ended terms that indicate the presence of stated elements or features, but do not preclude additional elements or features. The articles "a", "an" and "the" are intended to include the plural as well as the singular, unless the context clearly indicates otherwise.

With the above range of variations and applications in mind, it should be understood that the present invention is not limited by the foregoing description, nor is it limited by the accompanying drawings. Instead, the present invention is limited only by the following claims and their legal equivalents.

What is claimed is:
1. A method of cycle-by-cycle operation of a switched-mode power converter having a transformer with a primary side and a secondary side, the method comprising:
converting an input voltage at the primary side to an output voltage at the secondary side by switching transistor connected to the primary side from an on-state to an off-state during the present cycle;

detecting valleys in a voltage across the transistor in the off-state;

determining which valley at which the transistor is to be switched from the off-state to the on-state in the next switching cycle;

accessing one or more tables which associate individual peak current limit values with individual input voltage values for each valley, the one or more tables providing a separate association of individual peak current limit values to individual input voltage values for each of the valleys; and selecting from the one or more tables the individual peak current limit value associated with the input voltage and the valley at which the transistor is to be switched from the off-state to the on-state in the next switching cycle as a maximum peak current limit for the primary side above which the transistor is to be switched from the on-state to the off-state in the next switching cycle.

2. The method of claim 1, further comprising:

forcing the transistor to switch from the off-state to the on-state in an earlier valley than previously determined, if the maximum peak current limit for the primary side is met or exceeded in the present switching cycle and the previously determined valley is a higher valley for which the maximum peak current limit is determined, allowing the transferred power to be increased.

3. A method of cycle-by-cycle operation of a switched-mode power converter having a transformer with a primary side and a secondary side, the method comprising:

converting an input voltage at the primary side to an output voltage at the secondary side by switching a transistor connected to the primary side from an on-state to an off-state during the present cycle;

detecting valleys in a voltage across the transistor in the off-state;

determining which valley at which the transistor is to be switched from the off-state to the on-state in the next switching cycle;

accessing one or more tables which associate individual peak current limit values with individual input voltage values for each valley, the one or more tables providing a separate association of individual peak current limit values to individual input voltage values for each of the valleys;

selecting from the one or more tables the individual peak current limit value associated with the input voltage and the valley at which the transistor is to be switched from the off-state to the on-state in the next switching cycle as a maximum peak current limit for the primary side above which the transistor is to be switched from the on-state to the off-state in the next switching cycle; and forcing the transistor to switch from the off-state to the on-state in an earlier valley than previously determined, if the maximum peak current limit for the primary side is met or exceeded in the present switching cycle and the previously determined valley is a higher valley for which the maximum peak current limit is determined, allowing the transferred power to be increased.

4. The method of claim 3, wherein the maximum peak current limit for the primary side is initially determined for the next switching cycle as a function of the input voltage and the valley at which the transistor is to be switched from the off-state to the on-state in the next switching cycle.

* * * * *